United States Patent
Cackley et al.

(10) Patent No.: US 12,240,298 B2
(45) Date of Patent: Mar. 4, 2025

(54) ELONGATED SEAL, SEALING ASSEMBLY, AND METHOD OF INSTALLING THE SEAL

(71) Applicant: ARNOLD JÄGER HOLDING GMBH, Hannover (DE)

(72) Inventors: Jason Cackley, South Bend, IN (US); Leon Bogucki, Rolling Prairie, IN (US); Makoto Sato, Michigan City, IN (US); Ray Young, Wanatah, IN (US)

(73) Assignee: ARNOLD JÄGER HOLDING GMBH, Hannover (DE)

( * ) Notice: Subject to any disclaimer, the term of this patent is extended or adjusted under 35 U.S.C. 154(b) by 0 days.

(21) Appl. No.: 18/215,532

(22) Filed: Jun. 28, 2023

(65) Prior Publication Data

US 2025/0001851 A1  Jan. 2, 2025

(51) Int. Cl.
*B60J 10/84* (2016.01)
*B60J 10/15* (2016.01)
*B60J 10/246* (2016.01)
*B60J 10/34* (2016.01)

(52) U.S. Cl.
CPC ............... *B60J 10/84* (2016.02); *B60J 10/15* (2016.02); *B60J 10/246* (2016.02); *B60J 10/34* (2016.02)

(58) Field of Classification Search
CPC ....... F16J 15/0887; F16J 15/061; B60J 10/84; B60J 10/15; B60J 10/246; B60J 10/34
See application file for complete search history.

(56) References Cited

U.S. PATENT DOCUMENTS

| | | | |
|---|---|---|---|
| 6,966,590 B1 | 11/2005 | Ksiezopolki | |
| 7,614,677 B2 | 11/2009 | Ksiezopolski | |
| 9,033,390 B1 | 5/2015 | Ksiezopolski | |
| 9,045,027 B2 | 6/2015 | Young | |
| 9,625,037 B2 | 4/2017 | Young | |
| 10,208,860 B2 | 2/2019 | Young | |
| 10,323,749 B2 | 6/2019 | Maloney | |
| 2014/0001710 A1* | 1/2014 | Siegel | B60J 10/00 |
| | | | 277/630 |
| 2015/0291236 A1* | 10/2015 | Kseizopolski | B60P 3/34 |
| | | | 277/637 |
| 2016/0201893 A1* | 7/2016 | Ksiezopolski | E04B 1/6815 |
| | | | 362/311.01 |
| 2016/0214524 A1* | 7/2016 | Goode | B60J 10/00 |
| 2020/0317143 A1* | 10/2020 | Goode | B62D 63/061 |

\* cited by examiner

*Primary Examiner* — Gilbert Y Lee
(74) *Attorney, Agent, or Firm* — Barnes & Thornburg LLP

(57) ABSTRACT

An elongated seal comprises a base having an inner side and an outer side opposite to each other. Further, a bulb portion is integrally connected to the. An L-shaped clipping lug is integrally connected to the base via its proximal end. An angled distal end of the L-shaped clipping lug is adapted for releasably tucked under or clipped into an groove formed above a surface of an elongated mounting profile by at least one clipping bracket extending into a longitudinal direction. Further, a supporting means is positioned either at the outer side or at the inner side of base, whatever lies opposite to the L-shaped clipping lug. The supporting means is integrally connected to the base and/or is formed by the base such that the supporting means is adapted to supportingly rest on the elongated mounting profile without mechanical engagement in the installed state of the elongated seal.

12 Claims, 4 Drawing Sheets

ELONGATED SEAL, SEALING ASSEMBLY, AND METHOD OF INSTALLING THE SEAL

BACKGROUND

The present disclosure relates to recreational vehicles, and particularly to recreational vehicles having slide-out rooms. More particularly, the present disclosure relates to seals for slide-out rooms for recreational vehicles.

SUMMARY

According to the present disclosure, an elongated seal is described comprising a base having an inner side and an outer side opposite to each other, a bulb portion, and an L-shaped clipping lug. The bulb portion is integrally connected to the base in a cantilevered manner over the base. Further, the bulb portion has an arcuate portion extending into a sidewall portion and into a lower wall defining an enclosed space within the bulb portion. The L-shaped clipping lug is integrally connected to the base via its proximal end and positioned either at the inner side of the base or at the outer side of the base. Thus, the L-shaped clipping lug is provided only on one of the sides of the base. An angled distal end of the L-shaped clipping lug is adapted for releasably tucked under or clipped into an elongated groove that is formed above a surface of an elongated mounting profile by at least one clipping bracket extending into a longitudinal direction. Further, a supporting means is positioned either at the outer side of the base or at the inner side of the base, whatever lies opposite to the L-shaped clipping lug. The supporting means is integrally connected to the base, e.g., when formed as a vertical supporting leg protruding perpendicular to the base, and/or is formed by the base, e.g., as a non-protruding supporting section of the base itself, in such a way that the supporting means is adapted to supportingly rest on the elongated mounting profile without mechanical engagement in the installed state of the elongated seal. Therefore, the seal is mechanically clipped or fastened to the mounting profile on just one side (inner side or outer side) and unengagebly supported on the other side (outer side or inner side), omitting further mechanical engagement.

In illustrative embodiments, this allows for fast and easy assembly or installing the seal in the area of the opening for a slide-out room, as just one side of the seal needs to be clipped to the clipping arrangement on the mounting profile that is already attached to the sidewall defining the opening or will be attached to this sidewall afterwards. This can easily be accomplished without complex handling and positioning of the seal, making the installation less time-consuming and easier, especially after the mounting profile has already been mounted to the sidewall of the recreational vehicle. Thereby, the supporting means is sufficient to support or hold the seal in place until the seal is fastened to the mounting profile by additional fasteners, e.g., screws, rivets or adhesive means. As the seal is primarily fastened by these additional fasteners anyways, the supporting means (mechanically unengaging) and the single or individual L-shaped clipping lug (mechanically engaging), positioned on opposite sides of the base, can be safely used for pre-assembly.

The present disclosure also relates to a sealing assembly, in particular, a sealing assembly for a sidewall of a recreational vehicle, having an opening for receiving a slide-out room that can be extended or retracted. The sealing assembly has an elongated seal having an elongated base having an inner side and an outer side opposite to each other and an elongated bulb portion which is integrally connected to the base in a cantilevered manner over the base. The bulb portion has an arcuate portion extending into a sidewall portion and into a lower wall defining an enclosed space within the bulb portion. Further, an elongated L-shaped clipping lug is provided which is integrally connected to the base via its proximal end and positioned either at the inner side of the base or at the outer side of the base. In addition, a supporting means is positioned either at the outer side of the base or at the inner side of the base, whatever lies opposite to the L-shaped clipping lug. The supporting means is integrally connected to the base, e.g., when formed as a vertical supporting leg protruding perpendicular to the base, and/or is formed by the base, e.g., as a non-protruding supporting section of the base itself.

In illustrative embodiments, the assembly further contains a mounting profile having an elongated seal mounting section. The seal mounting section contains a clipping arrangement having at least one clipping bracket extending into a longitudinal direction of the mounting profile and forming an elongated groove above the surface of the seal mounting section. An angled distal end of the L-shaped clipping lug of the seal is releasably tucked under or clipped into or brought into mechanical engagement with the groove above the seal mounting section and the supporting means of the seal is supportingly resting on the seal mounting section without mechanical engagement. The base is positioned above the clipping arrangement and the L-shaped clipping lug and the supporting means are positioned on opposing sides of the clipping arrangement, with the clipping lug being mechanically engaged and the supporting means being mechanically unengaged to the clipping arrangement or the mounting profile.

The present disclosure also relates to a method for installing an elongated seal to an elongated mounting profile for providing a sealing assembly for a sidewall, such as a sidewall of a recreational vehicle, the method comprising the steps of:

providing an elongated seal having an elongated base having an inner side and an outer side opposite to each other, an elongated bulb portion integrally connected to the base in a cantilevered manner over the base, the bulb portion having an arcuate portion extending into a sidewall portion and into a lower wall defining an enclosed space within the bulb portion, and an L-shaped clipping lug integrally connected to the base via its proximal end and positioned either at the inner side of the base or at the outer side of the base wherein a supporting means is positioned either at the outer side of the base or at the inner side of the base, whatever lies opposite to the L-shaped clipping lug, wherein the supporting means is integrally connected to the base and/or is formed by the base;

providing a mounting profile having an elongated seal mounting section, wherein the seal mounting section contains a clipping arrangement having at least one clipping bracket extending into a longitudinal direction of the mounting profile and forming a groove above a surface of the seal mounting section;

placing the seal close to the seal mounting section of the mounting profile in such a way that the L-shaped clipping lug is adjacent to or is touching the at least one clipping bracket of the clipping arrangement;

rotating the seal around the clipping lug and/or shifting the seal in transverse direction into the elongated groove formed by the at least one clipping bracket for tucking under or clipping or bringing into mechanical engagement the clipping lug into the groove;

rotating and/or bending the seal while maintaining the clipping lug in the groove to bring the supporting means integrally connected to the base into contact with the seal mounting section for supporting the seal on the seal mounting section without mechanical engagement; and fastening the seal to the seal mounting section while the clipping lug is maintained or engaged in the groove and the supporting means supportingly rests on the seal mounting section without mechanical engagement.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1A:
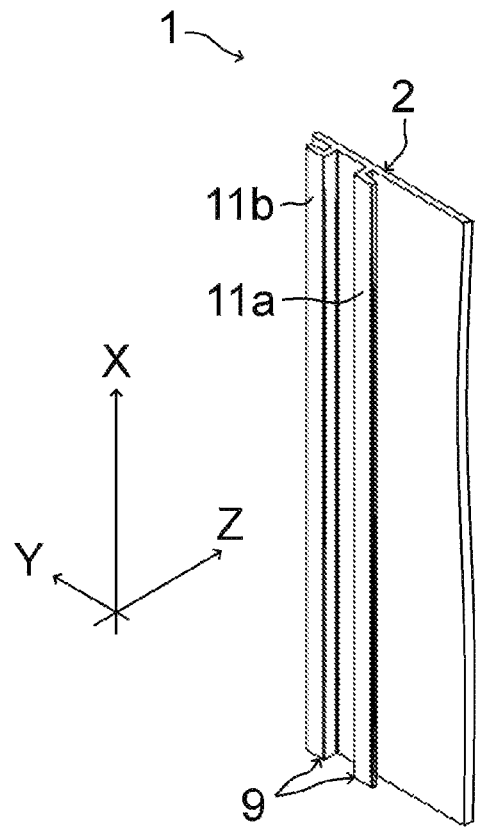
FIGS. 1A and 1B are different views of a mounting profile.

FIG. 1A shows a mounting profile 1 having a seal mounting section 2. As can be seen in the cross-sectional view of FIG. 1B the mounting profile 1 can be attached to a sidewall 5 of a vehicle (not shown), in particular, a recreational vehicle, in the area of an opening 6 in which a slide out room (not shown) is received. The opening 6 is defined by a transverse surface 5a of the sidewall 5 that extends between an inner surface 5b and an outer surface 5c of the sidewall 5.

In the installed state, the seal mounting section 2 of the mounting profile 1 is attached to the outer surface 5c of the sidewall 5. Thereby, an adhesive tape 20 or the like is placed between the outer surface 5c of the sidewall 5 and the mounting profile 1 in the area of the seal mounting section 2. As an alternative or in addition, other fastening means can be used for attaching the mounting profile 1 to the sidewall 5. Further, the seal mounting section 2 may transition into further elements, e.g., a wiper section (not shown) containing wiper seals extending inwardly from the sidewall 5 or the transverse surface 5a into the opening 6 and rubbing against a sidewall of the slide out room (not shown) providing an additional sealing effect, especially when the slide out room is extending or retracting.

In a preferred embodiment, the mounting profile 1 is made of a metallic material, especially aluminum, being a very lightweight material. But it is also possible to use other materials having higher strengths, e.g., steel or plastic having a high rigidity.

Figure 1B:
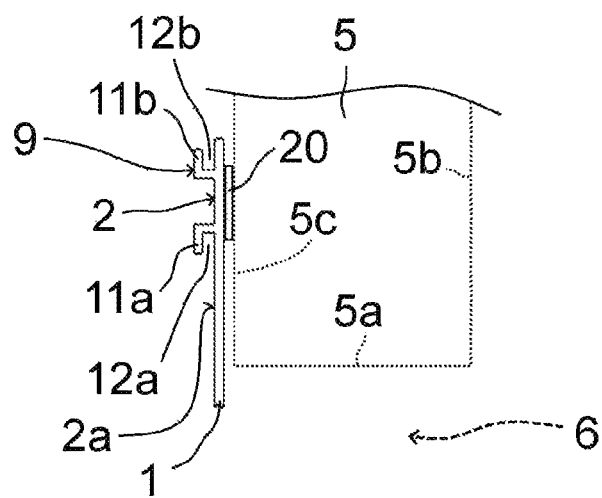
Figure 2A:
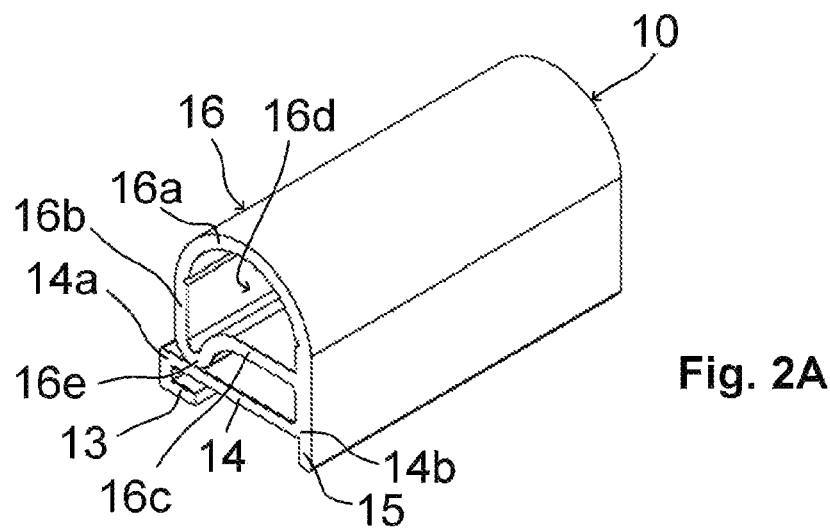
FIGS. 2A-2C are perspective views of elongated seals in different embodiments.
Figure 2B:
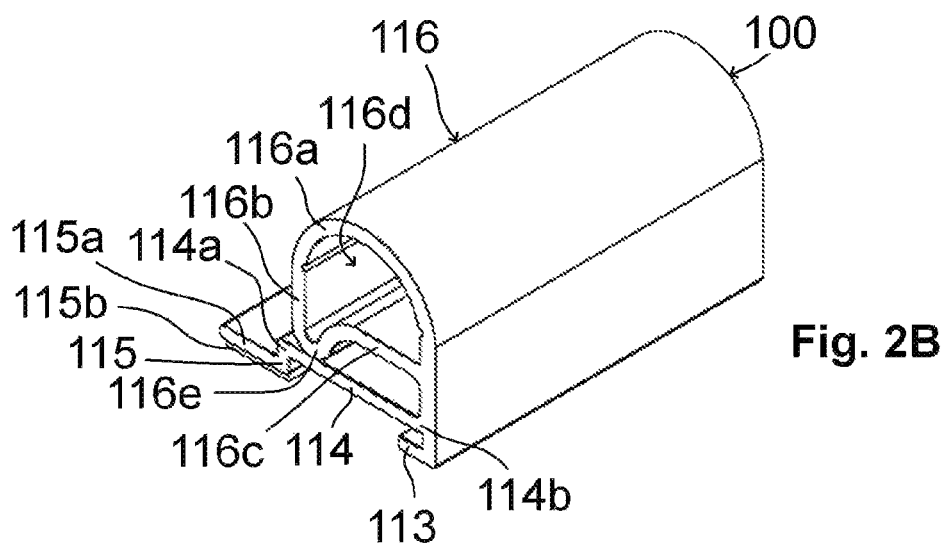
Figure 2C:
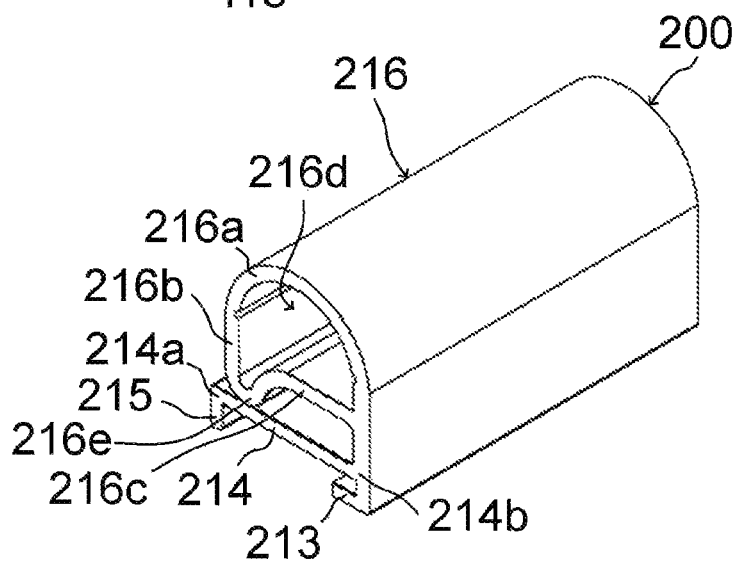

The seal mounting section 2 of the mounting profile 1 further contains a clipping arrangement 9 for releasably securing one of the elongated seals 10, 100, 200 shown in FIGS. 2A, 2B, 2C to the mounting profile 1. In the embodiments shown in FIGS. 1A, 1B the clipping arrangement 9 has a pair of L-shaped clipping brackets 11a, 11b facing away from each other and extending into the longitudinal direction X of the mounting profile 1. The L-shaped clipping brackets 11a, 11b each form a groove 12a, 12b above the surface 2a of the seal mounting section 2 for receiving an L-shaped clipping lug 13, 113, 213 attached to the elongated seal 10, 100, 200.

As can be seen from the views in FIGS. 2A, 2B, 2C each of these seals 10, 100, 200 contain just one L-shaped clipping lug 13, 113, 213 integrally connected to an inner side 14a of a base 14 of the seal 10 according to FIG. 2A or to an outer side 114b, 214b of the base 114, 214 of the seal 100, 200 according to FIGS. 2B, 2C via its proximal end. A vertical supporting leg 15, 115, 215 (vertical direction Z) is integrally connected to the respective opposing side of the base 14, 114, 214, i.e., to the outer side 14b of the base 14 of the seal 10 according to FIG. 2A and to the inner side 114a, 214a of the respective base 114, 214 according to FIGS. 2B, 2C.

Preferably, the seals 10, 100, 200 are made of a rubber-elastic or durometer material of, for example, approximately shore 90 A, e.g., single-durometer or multi-durometer EPDM (ethylene propylene diene monomer) or TPE (thermoplastic elastomer), manufactured by extrusion or injection molding by way of example. Also, other materials are possible, e.g., PVC, polypropylene, SEBS.

In each embodiment of the seals 10, 100, 200 a bulb portion 16, 116, 216 is attached to the outer side 14b, 114b, 214b of the respective base 14, 114, 214 in a cantilevered manner over the respective base 14, 114, 214. The bulb portion 16, 116, 216 has an arcuate portion 16a, 116a, 216a extending into a sidewall portion 16b, 116b, 216b and into a lower wall 16c, 116c, 216c defining an enclosed space 16d, 116d, 216d within the respective bulb portion 16, 116, 216. Further, a protrusion 16e, 116e, 216e is attached to the bulb portion 16, 116, 216 touching the base 14, 114, 214. As the bulb portion 16, 116, 216 is elastically joined to the base 14, 114, 214 the bulb portion 16, 116, 216 can be bent upwards or flipped up from the base 14, 114, 214 providing a gap between the protrusion 16e, 116e, 216e and the base 14, 114, 214.

Figure 3A:
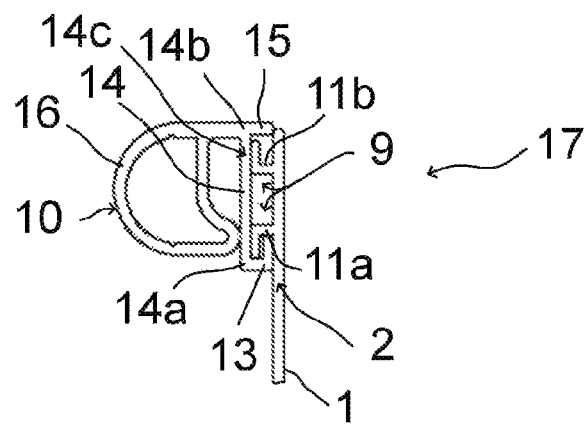
FIGS. 3A-3C are cross sectional views of sealing assemblies containing the seals of FIGS. 2A, 2B, 2C attached to the mounting profile of FIG. 1.
Figure 3B:
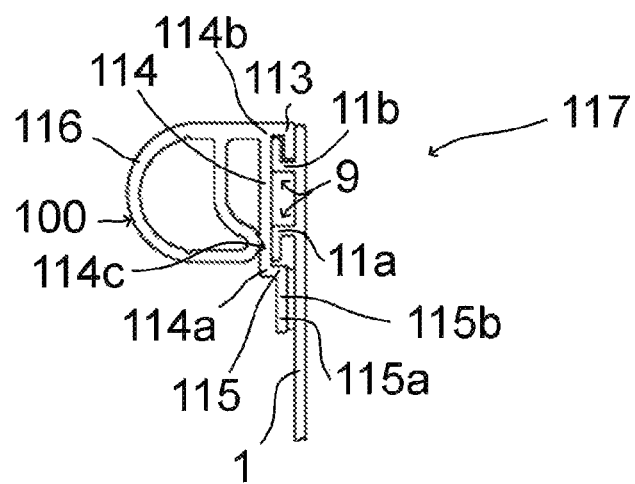
Figure 3C:
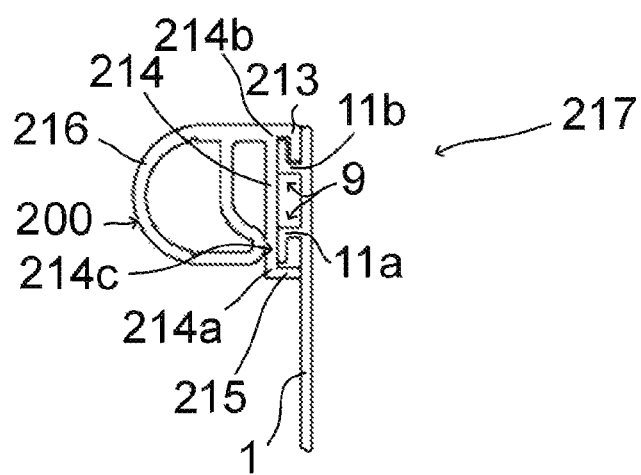

In order to secure or install these seals 10, 100, 200 to the mounting profile 1 of FIGS. 1A, 1B to provide a sealing assembly 17, 117, 217 as shown in FIGS. 3A, 3B, 3C the following steps are carried out:

First the mounting profile 1 and one of the respective seals 10, 100, 200 are provided, wherein the mounting profile 1 is (optionally) already been attached to the sidewall 5 of the vehicle as shown in FIG. 1B. Afterwards, the selected seal 10, 100, 200 is brought close to the seal mounting section 2 of the mounting profile 1 in such a way that the L-shaped clipping lug 13, 113, 213 is resting on the surface 2a of the seal mounting section 2 adjacent to the clipping arrangement 9, as exemplarily shown in FIG. 5 for the seal 10 according to the embodiment of FIG. 2A. Thereby, the clipping lug 13, 113, 213 does not necessarily have to be angled in relation to the surface 2a. This is followed by a rotation of the respective seal 10, 100, 200 around the clipping lug 13, 113, 213 and/or a shifting of the respective seal 10, 100, 200 in the transverse direction Y for tucking under or clipping an angled distal end of the clipping lug 13, 113, 213 into one of the grooves 12a, 12b formed by the L-shaped clipping brackets 11a. 11b of the clipping arrangement 9. Simultaneously the vertical supporting leg 15, 115, 215 is brought into contact with the surface 2a of the seal mounting section 2 for supporting this side of the seal 10, 100, 200. This whole process is simplified by the fact that the base 14, 114, 214 is resilient or elastic.

Figure 5:
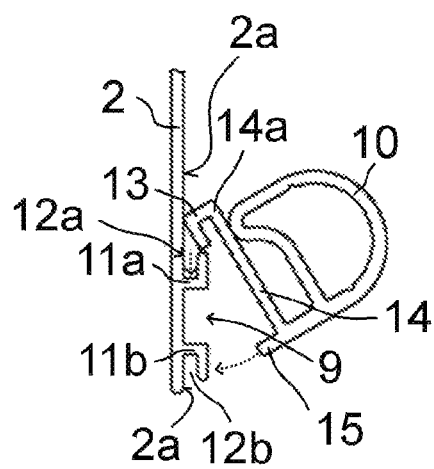
FIG. 5 is a view of an assembly process for installing the seal onto the mounting profile and manufacturing the seal assembly according to FIG. 4.

Thus, starting from FIG. 5, the seal 10 according to the embodiment shown in FIG. 2A is rotated and/or shifted like indicated in dotted lines in such a way that the angled distal end of the clipping lug 13 on the inner side 14a of the base 14 slides into the inner groove 12a of the inner clipping bracket 11a. After the angled distal end of the clipping lug 13 is fully received in the inner groove 12a or the angled distal end of the clipping lug 13 touches the vertical part of the inner clipping bracket 11a and/or the inner clipping bracket 11a touches the vertical part of the clipping lug 13, a further rotation, backed by the elasticity of the base 14, results in the vertical supporting leg 15 on the outer side 14b of the base 14 touching the surface 2a of the seal mounting section 2 (see FIG. 3A). Consequently, the base 14 extends over the clipping arrangement 9 with the seal 10 tucked under or clipped to the inner clipping bracket 11a by the clipping lug 13 and supported on the surface 2a of the seal mounting section 2 by the vertical supporting leg 15 adjacent to the outer clipping bracket 11b pointing to a terminal end of the seal mounting section 2.

In a similar manner, the seals 100, 200 according to the embodiments shown in FIGS. 2B, 2C are first resting with their respective clipping lugs 113, 213 on the surface 2a of the seal mounting section 2 adjacent to the outer clipping bracket 11b pointing to the terminal end of the seal mounting section 2. Afterwards, the respective seal 100, 200 is rotated and/or shifted in such a way that the angled distal end of the clipping lug 113, 213 on the outer side 114b, 214b of the base 114, 214 slides into the outer groove 12b of the outer clipping bracket 11b. After the angled distal end of the clipping lug 113, 213 is fully received in the outer groove 12b or the angled distal end of the clipping lug 113, 213 touches the vertical part of the outer clipping bracket 11b and/or the outer clipping bracket 11b touches the vertical part of the clipping lug 113, 213, a further rotation, backed by the elasticity of the base 114, 214, results in the vertical supporting leg 115, 215 on the inner side 114a of the base 114, 214 touching the surface 2a of the seal mounting section 2. Consequently, and inversely to the embodiment of the seal 10 of FIG. 2A, the base 114, 214 extends over the clipping arrangement 9 with the seal 100, 200 tucked under or clipped to the outer clipping bracket 11b by the clipping lug 113, 213 and supported on the surface 2a of the seal mounting section by the vertical supporting leg 115, 215. Additionally, in the embodiment of FIG. 2B, the vertical supporting leg 115 integrally transitions into a flat flange 115a having an adhesive strip 115b at the bottom for bonding the seal 100 to the mounting profile 1.

Consequently, in all of the embodiments described so far, the respective seal 10, 100, 200 is clipped to the clipping arrangement 9 on the mounting profile 1 just with that side on which the clipping lug 13, 113, 213 is located. On the opposing side, the respective seal 10, 100, 200 is supported by the vertical supporting leg 15, 115, 215, which is not clamped or clipped or tucked under the clipping arrangement 9, thus resting on the mounting profile 1 without mechanical engagement.

Figure 3D:
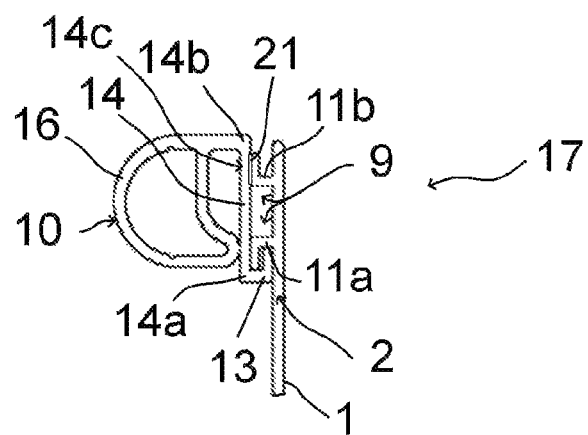
FIG. 3D is a cross sectional view of a further sealing assembly.
Figure 4:
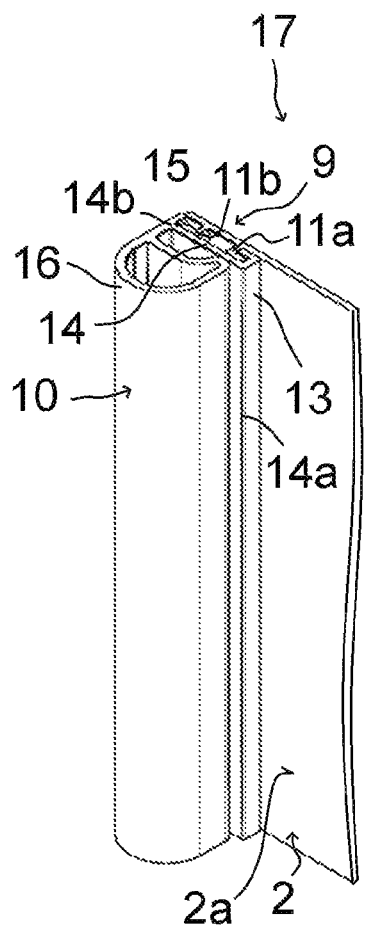
FIG. 4 is a perspective view of the sealing assembly according to FIG. 3A.

In an additional embodiment shown in FIG. 3D, the seal 10 is configured similar to the seal 10 of the first embodiment (FIG. 3A), but the vertical supporting leg 15 is omitted. In the installed state, a supporting section 14c of the base 14, positioned adjacent to the outer side 14b of the base 14 on the opposing side of the clipping lug 13, rests on the outer clipping bracket 11b of the clipping arrangement 9. Consequently, the seal 10 is supported by the supporting section 14c of the base 14 on the opposing side of the clipping lug 13 without mechanical engagement. Also, in the other embodiments described previously, the seal 10 is, in addition to the respective vertical supporting leg 15, 115, 215, supported by the supporting section 14c, 114c, 214c of the respective base 14, 114, 214 resting on the outer clipping bracket 11b according to FIG. 3A or on the inner clipping bracket 11a according to FIG. 3B, 3C.

An additional adhesive tape 21 (see FIG. 3D) may be attached to the outer clipping bracket 11b in order to secure the seal 10 via the supporting section 14c to the mounting profile 1 after the clipping lug 13 on the inner side 14a of the base 14 slid into the inner groove 12a of the inner clipping bracket 11a, thus, preventing the clipping lug 13 to slip out of the inner groove 12a of the inner clipping bracket 11a afterwards. This simplifies the installation process as the seal 10 can be fixed or prefixed to the mounting profile 1 and may be finally fixed afterwards, e.g., by screws.

Accordingly, it is also possible that just one of the clipping brackets 11a, 11b, the one which accommodates the clipping lug 13, 113, 213, is L-shaped and the other one, the one which lies adjacent to the vertical supporting leg 15, 115, 215 and/or underneath the supporting section 14c, 114c, 214c of the respective base 14, 114, 214, is formed as a vertically protruding rim adapted to partly support the base 14, 114, 214 of the respective seal 10, 100, 200 without providing mechanical engagement.

Thereby, it was realized that it is sufficient for the respective seal 10, 100, 200 to be securely held in place on the mounting profile 1 when installing the respective sealing assembly 17, 117, 217, if only one side is clipped to the clipping arrangement 9 and additional support is given by the respective vertical supporting leg 15, 115, 215 and/or the supporting section 14c, 114c, 214c of the respective base 14, 114, 215 on the other side without providing a further mechanical engagement.

In order to strengthen the connection between the respective seal 10, 100, 200 and the mounting profile 1, additional fasteners can be used between them, e.g., an adhesive strip positioned between the base 14, 114, 214 and at least the top surface(s) of (one of) the L-shaped clipping bracket(s) 11a, 11b, and/or (self-tapping) screws (not shown) which are driven through the base 14, 114, 214 and the mounting profile 1 in the area between the L-shaped clipping brackets 11a, 11b.

Recreational vehicles may be equipped with slide-out rooms that can be extended when the vehicle is parked, in order to expand the living space. Such slide-out rooms may be installed in openings of a sidewall of the vehicle, wherein a comparative sealing assembly provides that the opening is water sealed in the extended position as well as in the retracted position. Such sealing assemblies may be attached to the sidewall of the vehicles by adhesives strips for example.

In other variants, the comparative sealing assembly may have one or more mounting sections having rail like tabs facing outwardly forming a tongue connection. Bulb seals having complementary formed inwardly facing rail like tabs can be slidably attached to the mounting portion. When attached to the sidewall of the vehicle, the slidably connected bulb seals can engage the slide-out room in order to form a waterproof connection in the extended position. Additional wipers of the sealing assembly extend inwardly from the sidewall into the opening and rub against a sidewall of the slide out room to form an additional seal.

However, drawbacks of these comparative sealing assemblies are the complex installing and handling of the seals. In the sliding-in variant, the comparative elongated seal is sliding into the rail like channel all along its longitudinal extension, leading to a complex handling when inserting very long elongated seals. Pushing the elongated seals with its tabs into the tongue connection is also very complex and time-consuming.

According to the present disclosure, an elongated seal is described comprising a base having an inner side and an outer side opposite to each other, a bulb portion, and an L-shaped clipping lug. The bulb portion is integrally connected to the base in a cantilevered manner over the base. Further, the bulb portion has an arcuate portion extending into a sidewall portion and into a lower wall defining an enclosed space within the bulb portion. The L-shaped clipping lug is integrally connected to the base via its proximal end and positioned either at the inner side of the base or at the outer side of the base. Thus, the L-shaped clipping lug is provided only on one of the sides of the base. An angled distal end of the L-shaped clipping lug is adapted for releasably tucked under or clipped into an elongated groove that is formed above a surface of an elongated mounting profile by at least one clipping bracket extending into a longitudinal direction. Further, a supporting means is positioned either at the outer side of the base or at the inner side of the base, whatever lies opposite to the L-shaped clipping lug. The supporting means is integrally connected to the base, e.g., when formed as a vertical supporting leg protruding perpendicular to the base, and/or is formed by the base, e.g., as a non-protruding supporting section of the base itself, in such a way that the supporting means is adapted to supportingly rest on the elongated mounting profile without mechanical engagement in the installed state of the elongated seal. Therefore, the seal is mechanically clipped or fastened to the mounting profile on just one side (inner side or outer side) and unengagebly supported on the other side (outer side or inner side), omitting further mechanical engagement.

This allows for fast and easy assembly or installing the seal in the area of the opening for a slide-out room, as just one side of the seal needs to be clipped to the clipping arrangement on the mounting profile that is already attached to the sidewall defining the opening or will be attached to this sidewall afterwards. This can easily be accomplished without complex handling and positioning of the seal, making the installation less time-consuming and easier, especially after the mounting profile has already been mounted to the sidewall of the recreational vehicle. Thereby, the supporting means is sufficient to support or hold the seal in place until the seal is fastened to the mounting profile by additional fasteners, e.g., screws, rivets or adhesive means. As the seal is primarily fastened by these additional fasteners anyways, the supporting means (mechanically unengaging) and the single or individual L-shaped clipping lug (mechanically engaging), positioned on opposite sides of the base, can be safely used for pre-assembly.

The present disclosure also relates to a sealing assembly, in particular, a sealing assembly for a sidewall of a recreational vehicle, having an opening for receiving a slide-out room that can be extended or retracted. The sealing assembly has an elongated seal having an elongated base having an inner side and an outer side opposite to each other and an elongated bulb portion which is integrally connected to the base in a cantilevered manner over the base. The bulb portion has an arcuate portion extending into a sidewall portion and into a lower wall defining an enclosed space within the bulb portion. Further, an elongated L-shaped clipping lug is provided which is integrally connected to the base via its proximal end and positioned either at the inner side of the base or at the outer side of the base. In addition, a supporting means is positioned either at the outer side of the base or at the inner side of the base, whatever lies opposite to the L-shaped clipping lug. The supporting means is integrally connected to the base, e.g., when formed as a vertical supporting leg protruding perpendicular to the base, and/or is formed by the base, e.g., as a non-protruding supporting section of the base itself.

The assembly further contains a mounting profile having an elongated seal mounting section. The seal mounting section contains a clipping arrangement having at least one clipping bracket extending into a longitudinal direction of the mounting profile and forming an elongated groove above the surface of the seal mounting section. An angled distal end of the L-shaped clipping lug of the seal is releasably tucked under or clipped into or brought into mechanical engagement with the groove above the seal mounting section and the supporting means of the seal is supportingly resting on the seal mounting section without mechanical engagement. The base is positioned above the clipping arrangement and the L-shaped clipping lug and the supporting means are positioned on opposing sides of the clipping arrangement, with the clipping lug being mechanically engaged and the supporting means being mechanically unengaged to the clipping arrangement or the mounting profile.

The present disclosure also relates to a method for installing an elongated seal to an elongated mounting profile for providing a sealing assembly for a sidewall, such as a sidewall of a recreational vehicle, the method comprising the steps of:

providing an elongated seal having an elongated base having an inner side and an outer side opposite to each other, an elongated bulb portion integrally connected to the base in a cantilevered manner over the base, the bulb portion having an arcuate portion extending into a sidewall portion and into a lower wall defining an enclosed space within the bulb portion, and an L-shaped clipping lug integrally connected to the base via its proximal end and positioned either at the inner side of the base or at the outer side of the base wherein a supporting means is positioned either at the outer side of the base or at the inner side of the base, whatever lies opposite to the L-shaped clipping lug, wherein the supporting means is integrally connected to the base and/or is formed by the base;

providing a mounting profile having an elongated seal mounting section, wherein the seal mounting section contains a clipping arrangement having at least one clipping bracket extending into a longitudinal direction of the mounting profile and forming a groove above a surface of the seal mounting section;

placing the seal close to the seal mounting section of the mounting profile in such a way that the L-shaped clipping lug is adjacent to or is touching the at least one clipping bracket of the clipping arrangement;

rotating the seal around the clipping lug and/or shifting the seal in transverse direction into the elongated groove formed by the at least one clipping bracket for tucking under or clipping or bringing into mechanical engagement the clipping lug into the groove;

rotating and/or bending the seal while maintaining the clipping lug in the groove to bring the supporting means integrally connected to the base into contact with the seal mounting section for supporting the seal on the seal mounting section without mechanical engagement; and fastening the seal to the seal mounting section while the clipping lug is maintained or engaged in the groove and the supporting means supportingly rests on the seal mounting section without mechanical engagement.

An elongated seal comprises a base having an inner side and an outer side opposite to each other. Further, a bulb portion is integrally connected to the base in a cantilevered manner over the base. The bulb portion has an arcuate portion extending into a sidewall portion and into a lower wall defining an enclosed space within the bulb portion. An L-shaped clipping lug is integrally connected to the base via its proximal end and positioned either at the inner side or at the outer side of the base. An angled distal end of the L-shaped clipping lug is adapted for releasably tucked under or clipped into an elongated groove that is formed above a surface of an elongated mounting profile by at least one clipping bracket extending into a longitudinal direction. Further, a supporting means is positioned either at the outer side or at the inner side of base, whatever lies opposite to the L-shaped clipping lug. The supporting means is integrally connected to the base and/or is formed by the base such that the supporting means is adapted to supportingly rest on the elongated mounting profile without mechanical engagement in the installed state of the elongated seal.

The following numbered clauses include embodiments that are contemplated and non-limiting:

Clause 1. An elongated seal comprising: a base having an inner side and an outer side opposite to each other.

Clause 2. The elongated seal of clause 1, any other suitable clause, or any combination of suitable clause, further comprising a bulb portion integrally connected to the base in a cantilevered manner over the base, the bulb portion having an arcuate portion extending into a sidewall portion and into a lower wall defining an enclosed space within the bulb portion.

Clause 3. The elongated seal of clause 2, any other suitable clause, or any combination of suitable clause, further comprising an L-shaped clipping lug integrally connected to the base via its proximal end and positioned either at the inner side of the base or at the outer side of the base, wherein an angled distal end of the L-shaped clipping lug is adapted for releasably tucked under or clipped into an elongated groove that is formed above a surface of an elongated mounting profile by at least one clipping bracket extending into a longitudinal direction.

Clause 4. The elongated seal of clause 3, any other suitable clause, or any combination of suitable clause, wherein a supporting means is positioned either at the outer side of the base or at the inner side of the base, whatever lies opposite to the L-shaped clipping lug, wherein the supporting means is integrally connected to the base and/or is formed by the base such that the supporting means is adapted to supportingly rest on the elongated mounting profile without mechanical engagement in the installed state of the elongated seal.

Clause 5. The elongated seal of clause 4, wherein the supporting means is a vertical supporting leg integrally connected to the base and positioned either at the outer side of the base or at the inner side of the base, whatever lies opposite to the L-shaped clipping lug, the vertical supporting leg running substantially perpendicular to the base, in particular, being unbended or unangled at a terminal end that is opposite to the base, the vertical supporting leg being adapted for supportingly rest on the elongated mounting profile, e.g., on the surface of the elongated mounting profile, without mechanical engagement in the installed state of the elongated seal.

Clause 6. The elongated seal of clause 5, any other suitable clause, or any combination of suitable clause, wherein the vertical supporting leg of the seal is located on the outer side of the base and the clipping lug is located on the inner side of the base, opposite to the outer side of the base, the clipping lug on the inner side being adapted for releasably tucked under or clipped into an inner groove formed above the surface of the mounting profile by an inner clipping bracket, and the vertical supporting leg on the outer side being adapted for resting on the surface of the mounting profile without mechanical engagement adjacent to an outer clipping bracket on the mounting profile.

Clause 7. The elongated seal of clause 5, any other suitable clause, or any combination of suitable clause, wherein the vertical supporting leg of the seal is located on the inner side of the base and the clipping lug is located on the outer side of the base, opposite to the inner side of the base, the clipping lug on the outer side being adapted for releasably tucked under or clipped into an outer groove formed above the surface of the mounting profile by an outer clipping bracket, and the vertical supporting leg on the inner side being adapted for resting on the surface of the mounting profile without mechanical engagement adjacent to an inner clipping bracket on the mounting profile.

Clause 8. The elongated seal of clause 2, any other suitable clause, or any combination of suitable clause, wherein the vertical supporting leg integrally transitions into a flat flange facing away from the clipping lug and running perpendicular to the vertical supporting leg, wherein an adhesive strip is attached to the bottom of the flat flange adapted to be attached to the surface of the mounting profile for materially bonding the seal to the mounting profile.

Clause 9. The elongated seal of clause 1, any other suitable clause, or any combination of suitable clause, wherein the supporting means is formed by a non-protruding supporting section of the base, positioned adjacent to either the outer side of the base or to the inner side of the base, whatever lies opposite to the L-shaped clipping lug, the supporting section of the base being adapted to supportingly rest on the elongated mounting profile without mechanical engagement in the installed state of the elongated seal.

Clause 10. The elongated seal of clause 6, any other suitable clause, or any combination of suitable clause, wherein an adhesive tape is attached to the supporting section of the base adapted to be attached to the mounting profile for materially bonding the seal to the mounting profile.

Clause 11. The elongated seal according to clause 4, any other suitable clause, or any combination of suitable clause, wherein the seal is made of a rubber-elastic or durometer material of, for example, approximately shore 90 A, e.g., single-durometer or multi-durometer EPDM or TPE.

Clause 12. A sealing assembly for a sidewall, such as a sidewall of a recreational vehicle, comprising: an elongated seal.

Clause 13. The sealing assembly of clause 12, any other suitable clause, any suitable combination of clauses, wherein the elongated seal includes a base having an inner side and an outer side opposite to each other.

Clause 14. The sealing assembly of clause 13, any other suitable clause, any suitable combination of clauses, wherein the elongated seal further includes a bulb portion integrally connected to the base in a cantilevered manner over the base, the bulb portion having an arcuate portion extending into a sidewall portion and into a lower wall defining an enclosed space within the bulb portion; and an L-shaped clipping lug integrally connected to the base via its proximal end and positioned either at the inner side of the base or at the outer side of the base, wherein a supporting means is positioned either at the outer side of the base or at the inner side of the base, whatever lies opposite to the L-shaped clipping lug, wherein the supporting means is integrally connected to the base and/or is formed by the base.

Clause 15. The sealing assembly of clause 14, any other suitable clause, any suitable combination of clauses, wherein the elongated seal includes a mounting profile having an elongated seal mounting section; the seal mounting section containing a clipping arrangement having at least one clipping bracket extending into a longitudinal direction of the mounting profile the at least one clipping bracket forming an elongated groove above the surface of the seal mounting section; the base being positioned above the clipping arrangement and the L-shaped clipping lug and the supporting means being positioned on opposing sides of the clipping arrangement; and an angled distal end of the L-shaped clipping lug of the elongated seal being releasably tucked under or clipped into the elongated groove above the seal mounting section and the supporting means of the seal supportingly resting on the seal mounting section without mechanical engagement.

Clause 16. The sealing assembly of clause 15, any other suitable clause, or any combination of suitable clause, wherein the at least one clipping bracket of the clipping arrangement is L-shaped or T-shaped forming an elongated groove above the surface of the seal mounting section for receiving the L-shaped clipping lug of the seal.

Clause 17. The sealing assembly of clause 16, any other suitable clause, or any combination of suitable clause, wherein the clipping arrangement has two L-shaped clipping brackets facing away from each other and each forming an elongated groove above the surface of the seal mounting section, wherein the L-shaped clipping lug of the seal is releasably tucked under or clipped into one of the elongated grooves.

Clause 18. The sealing assembly of clause 17, any other suitable clause, or any combination of suitable clause, wherein the clipping arrangement has an L-shaped outer clipping bracket pointing to a terminal end of the seal mounting section and an L-shaped inner clipping bracket pointing in the opposite direction to the L-shaped outer clipping bracket.

Clause 19. The sealing assembly of claim 18, any other suitable clause, or any combination of suitable clause, wherein the supporting means is a vertical supporting leg integrally connected to the base of the seal and running substantially perpendicular to the base, in particular, being unbended or unangled at a terminal end that is opposite to the base.

Clause 20. The sealing assembly of clause 19, any other suitable clause, or any combination of suitable clause, wherein the vertical supporting leg is located on the outer side of the base and the clipping lug is located on the inner side of the base, opposite to the outer side of the base, wherein the clipping lug is releasably tucked under or clipped into an inner groove above the seal mounting section formed by the inner clipping bracket of the clipping arrangement and the vertical supporting leg of the seal supportingly rests on the surface of the seal mounting section adjacent to the outer clipping bracket of the clipping arrangement without mechanical engagement.

Clause 21. The sealing assembly of clause 19, any other suitable clause, or any combination of suitable clause, wherein the vertical supporting leg of the seal is located on the inner side of the base and the clipping lug is located on the outer side of the base, opposite to the inner side of the base, wherein the clipping lug is releasably tucked under or clipped into an outer groove above the seal mounting section formed by the outer clipping bracket of the clipping arrangement and the vertical supporting leg of the seal supportingly rests on the surface of the seal mounting section adjacent to the inner clipping bracket of the clipping arrangement without mechanical engagement.

Clause 22. The sealing assembly of clause 19, any other suitable clause, or any combination of suitable clause, wherein the vertical supporting leg integrally transitions into a flat flange facing away from the clipping lug and running perpendicular to the vertical supporting leg and facing away from the clipping arrangement and running in parallel to the surface of the mounting section, wherein an adhesive strip is attached to the bottom of the flat flange pointing to and attached to the surface of the mounting section for materially bonding the seal to the mounting section.

Clause 23. The sealing assembly of clause 15, any other suitable clause, or any combination of suitable clause, wherein a fastener is positioned between the base and the clipping arrangement, wherein the fastener is a screw or a rivet driven through the base of the seal and the mounting profile in the area of the clipping bracket and/or the fastener is an adhesive.

Clause 24. The sealing assembly of clause 19, any other suitable clause, or any combination of suitable clause, wherein the vertical supporting leg on the base of the seal is not tucked under or clipped to the clipping arrangement of the mounting section when supportingly resting on the surface of the mounting section adjacent to the clipping arrangement without mechanical engagement.

Clause 25. The sealing assembly of clause 15, any other suitable clause, or any combination of suitable clause, wherein the supporting means is formed by a non-protruding supporting section of the base, positioned adjacent to either the outer side of the base or to the inner side of the base, whatever lies opposite to the L-shaped clipping lug, the supporting section of the base supportingly rests on the elongated mounting profile, in particular, on the clipping arrangement, without mechanical engagement.

Clause 26. A method for installing an elongated seal to an elongated mounting profile for providing a sealing assembly for a sidewall, such as a sidewall of a recreational vehicle, comprising the steps of: providing an elongated seal.

Clause 27. The method of clause 26, any other suitable clause, or any combination of clauses, wherein the elongated seal includes a base having an inner side and an outer side opposite to each other.

Clause 28. The method of clause 27, any other suitable clause, or any combination of clauses, wherein the elongated seal further includes a bulb portion integrally connected to the base in a cantilevered manner over the base, the bulb portion having an arcuate portion extending into a sidewall portion and into a lower wall defining an enclosed space within the bulb portion; and an L-shaped clipping lug integrally connected to the base via its proximal end and positioned either at the inner side of the base or at the outer side of the base, wherein a supporting means is positioned either at the outer side of the base or at the inner side of the base, whatever lies opposite to the L-shaped clipping lug, wherein the supporting means is integrally connected to the base and/or is formed by the base.

Clause 29. The method of clause 28, any other suitable clause, or any combination of clauses, further comprising providing a mounting profile having an elongated seal mounting section; the seal mounting section containing a clipping arrangement having at least one clipping bracket extending into a longitudinal direction of the mounting profile the at least one clipping bracket forming an elongated groove above a surface of the seal mounting section.

Clause 30. The method of clause 29, any other suitable clause, or any combination of clauses, further comprising placing the seal close to the seal mounting section of the mounting profile in such a way that the L-shaped clipping lug is adjacent to or is touching the at least one clipping bracket of the clipping arrangement;

Clause 31. The method of clause 30, any other suitable clause, or any combination of clauses, further comprising rotating the seal around the clipping lug and/or shifting the seal in transverse direction into the elongated groove formed by the at least one clipping bracket for tucking under or clipping the clipping lug into the groove.

Clause 32. The method of clause 31, any other suitable clause, or any combination of clauses, further comprising rotating the seal while maintaining the clipping lug in the groove to bring the supporting means integrally connected to the base into contact with the seal mounting section for supporting the seal on the seal mounting section without mechanical engagement.

Clause 33. The method of clause 31, any other suitable clause, or any combination of clauses, further comprising bending the seal while maintaining the clipping lug in the groove to bring the supporting means integrally connected to the base into contact with the seal mounting section for supporting the seal on the seal mounting section without mechanical engagement.

Clause 34. The method of clause 31, any other suitable clause, or any combination of clauses, further comprising rotating and bending the seal while maintaining the clipping lug in the groove to bring the supporting means integrally connected to the base into contact with the seal mounting section for supporting the seal on the seal mounting section without mechanical engagement.

Clause 35. The method of clause 32, 33, or 34, any other suitable clause, or any combination of clauses, further comprising fastening the seal to the seal mounting section while the clipping lug is maintained or engaged in the groove and the supporting means supportingly rests on the seal mounting section without mechanical engagement.

The invention claimed is:

1. A sealing assembly for a sidewall, such as a sidewall of a recreational vehicle, the sealing assembly comprising:
    an elongated seal having a base having an inner side and an outer side opposite to each other; and a bulb portion integrally connected to the base in a cantilevered manner over the base, the bulb portion having an arcuate portion extending into a sidewall portion and into a lower wall defining an enclosed space within the bulb portion; and an L-shaped clipping lug integrally connected to the base via a proximal end of the L-shaped clipping lug and positioned either at the inner side of the base or at the outer side of the base, wherein a supporting means is positioned either at the outer side of the base or at the inner side of the base, opposite to the L-shaped clipping lug, wherein the supporting means is integrally connected to the base and/or is formed by the base; and
    a mounting profile having an elongated seal mounting section;
    the seal mounting section containing a clipping arrangement having at least one clipping bracket extending in a longitudinal direction of the mounting profile, the at least one clipping bracket forming an elongated groove above a surface of the seal mounting section;
    the base being positioned above the clipping arrangement and the L-shaped clipping lug and the supporting means being positioned on opposing sides of the clipping arrangement; and
    an angled distal end of the L-shaped clipping lug of the elongated seal being releasably tucked under or clipped into the elongated groove above the seal mounting section and the supporting means of the elongated seal supportingly resting on the seal mounting section without mechanical engagement.

2. The sealing assembly of claim 1, wherein the at least one clipping bracket of the clipping arrangement is L-shaped or T-shaped forming an elongated groove above the surface of the seal mounting section for receiving the L-shaped clipping lug of the elongated seal.

3. The sealing assembly of claim 2, wherein the clipping arrangement has two L-shaped clipping brackets facing away from each other and each forming an elongated groove above the surface of the seal mounting section, wherein the L-shaped clipping lug of the elongated seal is releasably tucked under or clipped into one of the elongated grooves.

4. The sealing assembly of claim 3, wherein the clipping arrangement has an L-shaped outer clipping bracket pointing to a terminal end of the seal mounting section and an L-shaped inner clipping bracket pointing in an opposite direction to the L-shaped outer clipping bracket.

5. The sealing assembly of claim 4, wherein the supporting means is a vertical supporting leg integrally connected to the base of the elongated seal and running substantially perpendicular to the base, in particular, being unbended or unangled at a terminal end that is opposite to the base.

6. The sealing assembly of claim 5, wherein the vertical supporting leg is located on the outer side of the base and the clipping lug is located on the inner side of the base, opposite to the outer side of the base, wherein the clipping lug is releasably tucked under or clipped into an inner groove above the seal mounting section formed by the inner clipping bracket of the clipping arrangement and the vertical supporting leg of the elongated seal supportingly rests on the surface of the seal mounting section adjacent to the outer clipping bracket of the clipping arrangement without mechanical engagement.

7. The sealing assembly of claim 5, wherein the vertical supporting leg of the elongated seal is located on the inner side of the base and the clipping lug is located on the outer side of the base, opposite to the inner side of the base, wherein the clipping lug is releasably tucked under or clipped into an outer groove above the seal mounting section formed by the outer clipping bracket of the clipping arrangement and the vertical supporting leg of the elongated seal supportingly rests on the surface of the seal mounting section adjacent to the inner clipping bracket of the clipping arrangement without mechanical engagement.

8. The sealing assembly of claim 5, wherein the vertical supporting leg integrally transitions into a flat flange facing away from the clipping lug and running perpendicular to the vertical supporting leg and facing away from the clipping arrangement and running in parallel to the surface of the seal mounting section, wherein an adhesive strip is attached to a bottom of the flat flange pointing to and attached to the surface of the seal mounting section for materially bonding the elongated seal to the seal mounting section.

9. The sealing assembly of claim 5, wherein the vertical supporting leg on the base of the elongated seal is not tucked under or clipped to the clipping arrangement of the mounting section when supportingly resting on the surface of the seal mounting section adjacent to the clipping arrangement without mechanical engagement.

10. The sealing assembly of claim 1, wherein a fastener is positioned between the base and the clipping arrangement, wherein the fastener is a screw or a rivet driven through the base of the elongated seal and the mounting profile in the area of the clipping bracket and/or the fastener is an adhesive.

11. The sealing assembly of claim 1, wherein the supporting means is formed by a non-protruding supporting section of the base, positioned adjacent to either the outer side of the base or to the inner side of the base, opposite to the L-shaped clipping lug, the supporting section of the base supportingly rests on the mounting profile, in particular, on the clipping arrangement, without mechanical engagement.

12. A method for installing an elongated seal to an elongated mounting profile for providing a sealing assembly for a sidewall, the method comprising steps of:
providing the elongated seal having: a base having an inner side and an outer side opposite to each other; and a bulb portion integrally connected to the base in a cantilevered manner over the base, the bulb portion having an arcuate portion extending into a sidewall portion and into a lower wall defining an enclosed space within the bulb portion; and an L-shaped clipping lug integrally connected to the base via its proximal end and positioned either at the inner side of the base or at the outer side of the base, wherein a supporting means is positioned either at the outer side of the base or at the inner side of the base, opposite to the L-shaped clipping lug, wherein the supporting means is integrally connected to the base and/or is formed by the base;
providing the elongated mounting profile having an elongated seal mounting section; the seal mounting section containing a clipping arrangement having at least one clipping bracket extending into a longitudinal direction of the mounting profile the at least one clipping bracket forming an elongated groove above a surface of the seal mounting section;
placing the elongated seal close to the seal mounting section of the mounting profile in such a way that the L-shaped clipping lug is adjacent to or is touching the at least one clipping bracket of the clipping arrangement;
rotating the elongated seal around the clipping lug and/or shifting the elongated seal in a transverse direction into the elongated groove formed by the at least one clipping bracket for tucking under or clipping the clipping lug into the groove;
rotating and/or bending the elongated seal while maintaining the clipping lug in the groove to bring the supporting means integrally connected to the base into contact with the seal mounting section for supporting the elongated seal on the seal mounting section without mechanical engagement; and
fastening the elongated seal to the seal mounting section while the clipping lug is maintained or engaged in the groove and the supporting means supportingly rests on the seal mounting section without mechanical engagement.

* * * * *